United States Patent [19]

Hess et al.

[11] 4,403,105

[45] Sep. 6, 1983

[54] GAS-INSULATED BUSHING HAVING FINGER CONTACT EXPANSION JOINT

[75] Inventors: Robert L. Hess, North Versailles; Zeno Neri, Wilkins Township, Allegheny County, both of Pa.

[73] Assignee: Westinghouse Electric Corp., Pittsburgh, Pa.

[21] Appl. No.: 373,751

[22] Filed: Apr. 30, 1982

[51] Int. Cl.³ ............................................. H01B 17/26
[52] U.S. Cl. ............................ 174/31 R; 174/12 BH
[58] Field of Search .............. 174/12 BH, 31 R, 75 F, 174/153 R

[56] References Cited

U.S. PATENT DOCUMENTS

| | | | |
|---|---|---|---|
| 3,566,001 | 2/1971 | McCloud | 174/12 BH X |
| 4,111,511 | 9/1978 | Bolin | 339/64 R |
| 4,188,516 | 2/1980 | Patel et al. | 339/64 R X |

FOREIGN PATENT DOCUMENTS 741066 11/1955 United Kingdom ........... 174/12 BH

*Primary Examiner*—Laramie E. Askin
*Attorney, Agent, or Firm*—M. S. Yatsko

[57] ABSTRACT

A gas-insulated bushing includes an elongated hollow insulating shell with an elongated inner conductor disposed therein spaced apart from the insulating shell, with an insulating gas electrically insulating the conductor from the insulating shell. A terminal is sealingly secured to the insulating shell and prevents the escape from the interior of the shell of the insulating gas disposed therein. The terminal includes an electrical connector which is external to the shell and which includes a portion extending inwardly into the shell. This electrical connector is aligned with, but spaced apart from, the electrical conductor to provide room for thermal expansion of the electrical conductor. Provisions are included for electrically connecting the central electric conductor with the electrical connector, which includes a conductor adapter secured to the electric conductor and extending outwardly therefrom to adjacent the electrical connector in an overlapping relationship, with the adapter having a recess therein in which is disposed a contact finger which extends outwardly from the adapter to slidingly contact the electrical connector.

5 Claims, 2 Drawing Figures

GAS-INSULATED BUSHING HAVING FINGER CONTACT EXPANSION JOINT

CROSS-REFERENCE TO RELATED APPLICATION

Reference is made to an application for Letters Patent entitled "High Current Contact" by J. R. Meyer, Ser. No. 288,609, filed July 30, 1981, and assigned to the same assignee as the present invention.

BACKGROUND OF THE INVENTION

This invention relates generally to electrical apparatus, and more particularly to a gas-insulated bushing which utilizes sliding contact fingers to maintain electrical contact in an expansion joint.

Gas-insulated electrical bushings are generally utilized for providing connections between overhead electric power transmission lines and elements of gas-insulated substations. These bushings typically comprise a hollow, elongated outer insulating shell, a centrally disposed electrical conductor disposed within the shell, and an insulating gas electrically insulating the electrical conductor from the insulating shell. The electrical conductor is used to transfer power from the transmission line to the associated substation equipment. In so transferring this power, though, the electrical conductor itself is heated, and this heating results in thermal expansion and contraction of the electrical conductor. This thermal expansion and contraction must be compensated for in the design of the bushing so as to maintain both a positive pressure seal within the insulating shell, and positive electrical contact between the conductor and the terminal connected to the power line. Prior art bushings utilized an expansion cap which included a diaphragm in the form of a thin metal spinning to provide for expansion and contraction of the bushing conductor due to the thermal stresses imposed upon it. However, use of this diaphragm has certain drawbacks, the most serious of which involves the difficulty of welding to this diaphragm.

SUMMARY OF THE INVENTION

In accordance with this invention, a more desirable gas-insulated bushing is provided which includes an elongated hollow insulating shell having an elongated inner conductor disposed therein spaced apart from the insulating shell. Means are provided for supporting the conductor in the shell, and an insulating gas electrically insulates the conductor from the insulating shell. Terminal means are sealingly secured to the insulating shell and prevent the escape, from the interior of the shell, of the insulating gas disposed therein. These terminal means include an electrical connector which is external to the shell and includes a portion extending inwardly into the shell. This electrical connector is aligned with, but spaced apart from, the electrical conductor to provide room for thermal expansion of the electrical conductor. Means are included for electrically connecting the central electric conductor with the electrical connector. This connecting means includes a conductor adapter secured to the electric conductor and extending outwardly therefrom to adjacent the electrical connector in an overlapping relationship, with the adapter having a recess therein in which is disposed a contact finger which extends outwardly from the adapter to slidingly contact the electrical connector.

BRIEF DESCRIPTION OF THE DRAWINGS

Reference is now made to the description of the preferred embodiment, illustrated in the accompanying drawings, in which.

DESCRIPTION OF THE PREFERRED EMBODIMENT

Figure 1:
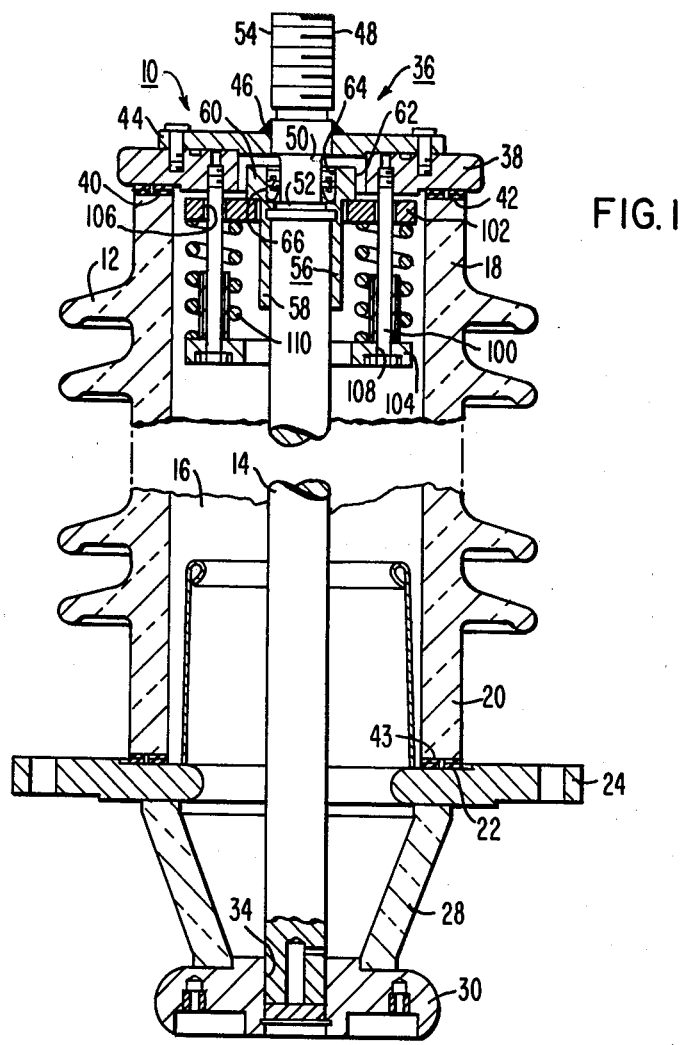
FIG. 1 is a cross-sectional view of a gas-insulated bushing utilizing the teachings of this invention.

Referring now more particularly to FIG. 1, therein is illustrated the gas-insulated bushing 10 of this invention. The bushing 10 is comprised of an elongated, hollow insulating shell 12 with an elongated electric conductor 14 centrally disposed therein spaced apart from the insulating shell 12. The electric conductor 14 would be of a good electrically conducting material such as aluminum, and the insulating shell 12 would be of porcelain or epoxy. Disposed within the insulating shell 12, and electrically insulating the central conductor 14 from the shell 12 is a good electrically insulating gas typical of which is sulfur hexafluoride 16. The shell 12 is typically vertically oriented, and has a top end portion 18 and a bottom end portion 20.

Connected to the bottom portion 20 of the shell 12 is a bottom mounting flange 24, with a sealing gasket 22 being disposed therebetween. An insulating frustum 28 is connected to the mounting flange. The frustum 28, in turn, is secured to a bottom terminal 30 which is made of an electrically conducting material. The bottom terminal 30 has a centrally disposed, threaded opening 34 therein into which is screwed the electric conductor 14. In this manner, the mounting flange 24, the frustum 28, and the bottom terminal 30 are utilized for supporting and spatially locating the conductor 14 in the insulating shell 12. Additionally, these three elements 24, 28, and 30 are utilized to seal the bottom portion 20 of the insulating shell 12 to prevent the escape of the insulating gas 16 through the bottom portion of the shell 12.

Terminal means 36 are utilized to sealingly seal the top portion 18 of the insulating shell 12 to prevent the escape of the insulating gas 16 from inside the shell 12 out the top portion 18 thereof. The terminal means 36, as illustrated, comprise the top plate 38 which is sealingly disposed on the top 18 of the insulating shell 12, with a seal or gasket 40 disposed therebetween preventing the escape of the insulating gas 16 through the joint 42 between the top plate 38 and the shell top portion 18. Bolted to the top plate 38 is the terminal plate 44 which in turn is secured, by means such as the weld 46, to the electrical connector 48. The electrical connector 48, as can be seen from the illustration, is disposed externally to the shell 12 but includes a lower extending portion 50 which extends inwardly into the interior of the insulating shell 12. The connector 48 is aligned with, but is spaced apart from, the electric conductor 14. The gap 52 between the connector 48 and the conductor 14 is utilized to allow expansion of the electric conductor 14 due to the thermal stresses imposed upon it when conducting current. The external portion 54 of the connector 48 would be connected, for example, to an incoming power transmission line (not shown).

Means 56 are provided for electrically connecting the conductor 14 with the connector 48. These connecting means 56 include the conductor adapter 58 which is screwed onto the electric conductor 14, which adapter 58, at its uppermost portion 60 thereof, includes a flange portion 62 and a recess 64 formed therein. The adapter 58 extends outwardly and upwardly from the conductor 14 to adjacent the electrical connector 48 in an overlapping relationship therewith. Disposed within the adapter recess 64 is a plurality of contact fingers 66 which contact fingers 66 extend outwardly from the recess 64 to slidingly contact the electrical connector 48. In this fashion, electrical connection is made between the conductor 14 and the connector 48 which allows for thermal expansion and contraction of the conductor 14.

Figure 2:
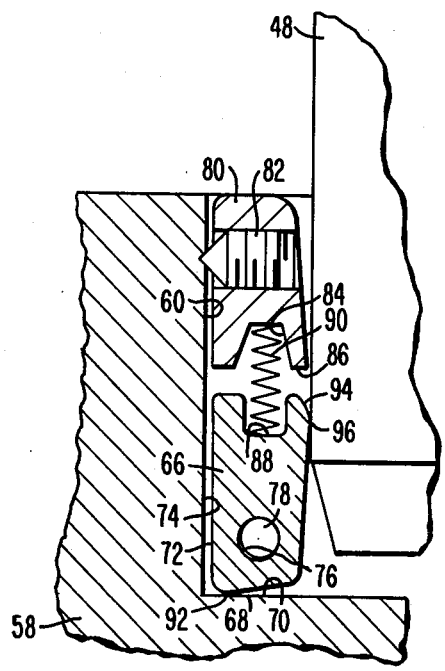
FIG. 2 is an enlarged view of the contact fingers.

Referring now to FIG. 2, therein is illustrated a detailed view of the contact fingers 66 and illustrates how they function to provide electrical contact between the conductor 14 and the connector 48. Each of the contact fingers 66 has an end surface 68 which is seated against the surface 70 of the conductor adapter 58, and a radial surface 72 which is disposed adjacent to the surface 74 of the recess 60 of the adapter 58. The end surface 68 and the radial surface 72 of the contact finger 66 intersect at an angle which is less than 90°.

Each of the contact fingers 66 has an aperture 76 therethrough through which extends a circular, metallic stabilizer ring 78. During construction of the assembly, the contact fingers 66 are strung upon the stabilizer ring 78 like beads upon a necklace. The ends of the stabilizer ring 78 may then, for example, be crimped to slightly enlarge them and prevent the contact fingers 66 from sliding off. In addition to aiding in the assembly of the device, the stabilizer ring 78, by maintaining the contact fingers 66 in close proximity to each other, provides lateral stability and prevents the fingers 66 from slipping out of place during operation of the fingers 66 upon thermal expansion of the conductor 14.

Also disposed within the recess 60 is a generally annular holder 80 which is spaced apart from the contact fingers 66, and which is secured to the adapter 58 by means such as the pin 82. The holder 80 has a circumferential channel 84 formed in the confronting surface 86 thereof, and each contact finger 66 has a recessed spring seat 88 therein. Disposed between the contact fingers 66 and the holder 80 are a plurality of individual helical coil springs 90, with each contact finger 66 having a helical coil spring 90 disposed therein. Preferably, the diameter of each spring 90 is greater than the radial diameter of the spring seat 88 so that when the spring 90 is inserted from the side by an automated mechanical procedure (prior to stringing the finger 66 on the ring 78), the spring 90 is compressed across its diameter and elongated in a direction perpendicular to the plane of the drawing. The spring 90 is thus securely retained by the spring seat 88 and will not fall out or come loose during assembly or operation. The other end of the coil spring 90, which is disposed within the channel 84 in the holder 80, is secured thereto by means such as a flexible adhesive (not shown).

The force of the spring 90 causes the contact finger 66 to bear against the adapter surface 70 at the point 92. As can be seen from FIG. 2, the bearing point 92 is offset from the line of action of the spring 90. This causes the force from the spring 90 to resolve into a component parallel to the direction of relative motion between the conductor 14 and adapter 58, on the one hand, and the electrical connector 48, and a second force component perpendicular to that direction. A contact pressure is thus maintained between the contact finger 66 and the adapter 58 at the point 92, and another contact pressure at the point 94 between the protruding surface 96 of the finger contact 66 and the electrical connector 48. By adjusting the offset distance between the spring-force line of action and the engagement point 92, the relative contact pressure can be adjusted in any manner desired. A more detailed description of the contact finger 66 may be found in the heretofore referenced patent application by Meyer, whose disclosure is incorporated hereinto by reference.

Disposed within the shell 12 (FIG. 1) is an elongated bolt 100 which functions as a spring support and which is screwed into the top plate 38. Two spring plates, 102, 104 each have holes 106, 108 respectively therethrough, with the bolt 100 extending through the holes 106, 108 of the spring plates 102, 104. The top spring plate 102 butts against, and contacts, the adapter flange 62. A compression spring 110 is disposed between the top plate 102 and the bottom plate 104, and functions to exert a spring force against the upper spring plate 102 in the upwards direction. This force is transmitted to the adapter flange 62 which, in turn, transmits an upward biasing force onto the electric conductor 14. Because the upper plate 102 is capable of slidably moving over the bolt 100, expansion or contraction of the conductor 14, which would result in a longitudinal movement of the conductor 14, does not remove the effect of the spring force being transmitted to the conductor 14.

Because of the upward force exerted against the adapter flange 62 by the top spring plate 102 and the spring 110, the upward bias of the conductor 14 functions also to increase the compression which exists between the top plate 38 and the top portion 18 of the insulating shell at the joint 42. The upward force exerted on the conductor 14 is transferred to a likewise upward force exerted on the bottom terminal 30, the frustum 28, and the mounting flange 24, and is transmitted against the gasket 22 to seal the joint 43 between the mounting flange 24 and insulating shell 12 to prevent the escape of insulating gas 16. The upward force is also transmitted through the insulating shell 12 to thereby compress the seal 40 between the shell 14 and the top plate 38. It is to be noted, in this regard, that the spring 110 is likewise exerting a downward force on the bolt 100 which, in turn, is transmitting this downward bias to the top plate 38.

Therefore, it can be seen that the bushing of this invention provides for thermal expansion of the inner electrical conductor while still maintaining electrical contact between the conductor and the external terminal connector.

We claim as our invention:
1. A gas-insulated bushing comprising:
an elongated, hollow insulating shell having first and second ends;
an elongated electric conductor disposed within, and spaced-apart from, said insulating shell;
means for supporting said conductor in said insulating shell;
an insulating gas disposed within said insulating shell and electrically insulating said conductor from said insulating shell;
terminal means sealingly secured to said insulating shell first end preventing the escape of said insulating gas from within said insulating shell, said terminal means including an electrical connector external to said shell and extending inwardly inside said shell, said electrical connector being aligned with, but spaced-apart from, said electric conductor; and means electrically connecting said electric conductor with said electrical connector, said electrical connecting means comprising a conductor adapter secured to said electric conductor and extending outwardly therefrom to adjacent said electrical connector in an overlapping relationship therewith, said adapter having a recess therein, and a contact finger disposed in said adapter recess and extending outwardly therefrom to slidingly contact said electrical connector.

2. The bushing according to claim 1 wherein said electrical connecting means includes resilient biasing means acting upon and producing a force on said contact finger, said force having a component in a first direction producing contact pressure between said contact finger and said electrical connector and a larger component in a second direction at a right angle to said first direction producing contact pressure between said contact finger and said conductor adapter.

3. The bushing according to claim 2 including a holder, disposed within said recess spaced-apart from said contact, secured to said conductor adapter and having a grooved channel formed therein, and wherein said contact finger has a recessed spring seat therein and said biasing means comprises a helical spring secured at one end thereof to said spring seat and having the other end thereof disposed within said holder channel.

4. The bushing according to claim 2 including a plurality of contact fingers disposed within said adapter recess each having an aperture therein centered on an axis perpendicular to both of said biasing means force components, and a stabilizer ring extends through all of said apertures.

5. The bushing according to claim 1 wherein said conductor adapter includes a flange, and including:
 an elongated spring support secured to said terminal means inside said insulating shell;
 first and second spring plates each having an opening therethrough through which said spring support extends, said spring plates being slidable over said spring support, said first spring plate being disposed adjacent to, and contacting, said adapter flange; and
 a spring disposed between, and contacting, said first and second spring plates.

* * * * *